350-3.78 SR

OR 3,909,112 J

United States Patent

Matsumura et al.

[11] 3,909,112

[45] Sept. 30, 1975

[54] OPTICAL PROCESSING APPARATUS

[75] Inventors: Masaru Matsumura, Kokubunji; Yoshikazu Miyamoto, Kodaira; Yoshihiro Onishi, Kokubunji, all of Japan

[73] Assignee: Hitachi, Ltd., Japan

[22] Filed: Oct. 16, 1972

[21] Appl. No.: 297,753

[30] Foreign Application Priority Data

Oct. 18, 1971 Japan .............................. 46-81683

[52] U.S. Cl. ........ 350/160 R; 350/3.5; 340/146.3 F

[51] Int. Cl.² .......................................... G02B 5/30

[58] Field of Search ... 350/3.5, 162 SF, 150, 160 R, 350/DIG. 1; 340/146.3 P, 146.3 F; 356/71

[56] References Cited

UNITED STATES PATENTS

| | | | |
|---|---|---|---|
| 2,594,358 | 4/1952 | Shaw | 350/DIG. 1 |
| 3,555,987 | 1/1971 | Browning | 350/167 X |
| 3,608,994 | 9/1971 | McDonnell | 350/3.5 |
| 3,644,019 | 2/1972 | Bestenreiner et al. | 350/162 SF |
| 3,700,902 | 10/1972 | Buchan | 350/162 SF |

*Primary Examiner*—Ronald L. Wibert
*Assistant Examiner*—Clark: Conrad J.
*Attorney, Agent, or Firm*—Craig & Antonelli

[57] ABSTRACT

Coherent light from a laser light source is caused to illuminate a film on which a plurality of holograms are recorded. A reconstructing light beam from the film is caused to be incident on an optical information modulator. The phase or amplitude of the reconstructing light beam is modulated by the modulator. The modulated light beam emanating therefrom is further focused on a predetermined position of a photo-detector consisting of a plurality of photocells.

19 Claims, 10 Drawing Figures

OPTICAL PROCESSING APPARATUS

BACKGROUND OF THE INVENTION

1. FIELD OF THE INVENTION

The present invention relates to optical processing apparatus which conducts arithmetical processing of spacial optical information simply and easily.

2. Description of the Prior Art.

In case of processing a number of two-dimensional optical information etc., there has heretofore been adopted a method in which the two-dimensional optical information are sequentially processed, or a method in which they are processed in parallel by means of a plurality of processing units. To process a plurality of two-dimensional information by means of a single processing unit, has been difficult for reasons such as difficulty in fixation of the positions of images. Similarly, in the so-called information retrieval in which information satisfying desired conditions are extracted from among a plurality of information, it has been difficult to take out a plurality of coincident information at high speed. Even if such processing is possible, it has had the disadvantage of the structural complexity of the apparatus.

SUMMARY OF THE INVENTION

An object of the present invention is to solve the problems as mentioned above, and to provide apparatus which processes and retrieves a plurality of spacial optical information promptly in a simple construction.

In accordance with the present invention optical processing apparatus comprises a light source, storage means for a plurality of spacial optical information, light signal modulating means to modulate an image of said each optical information stored in said storage means, said modulating means being arranged at a position at which said each image is reconstructed by illumination of said storage means with from said light source, means to focus light from said light modulating means, and light detecting means to detect the focused light.

DESCRIPTION OF THE PREFERRED EMBODIMENTS

Figure 1:
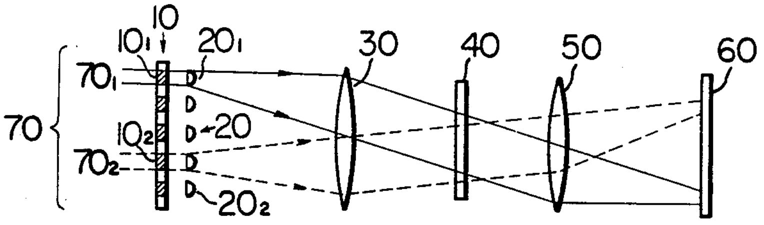
FIG. 1 is a diagram of the principle construction of optical processing apparatus according to the present invention.

FIG. 1 is a diagram for explaining the basic principle of the present invention. In the figure, reference numeral 10 designates a storage means consisting of, in this embodiment, a film on which minute two-dimensional information are recorded, 20 a group of micro-lenses respectively corresponding to the two-dimensional information on the film 10, 30 a lens, 40 an optical information modulator employing a perforated plate, a film, an electro-optical crystal, a magnetic bubble device, or the like, 50 a lens, 60 a photodetector consisting of, for example, a plurality of photocells, and 70 coherent or incoherent light fluxes from a light source (not shown). In the construction, the film 10 is arranged on the front focal plane of the group of micro-lenses 20, the distance between the group of micro-lenses 20 and the lens 30 is made equal to the sum of the focal lengths of both the lenses, and the optical information modulator 40 is arranged on the rear focal plane of the lens 30. In this way, when the light fluxes $70_1$ and $70_2$, for example, are successively or simultaneously directed to the minute two-dimensional information $10_1$ and $10_2$ on the film 10, respectively, magnified images of the information $10_1$ and $10_2$ always appear at an identical position at which the optical information modulator 40 is disposed, irrespective of the difference of the positions of the information $10_1$ and $10_2$. This applies to all the minute two-dimensional information on the film 10. It is accordingly made possible to control a number of two-dimensional information on the film 10 by means of the single optical information on the film 10 by means of the single optical information modulator 40. The operated results, between the respective two-dimensional information on the film 10 and the optical information modulator 40 as are thus obtained, are respectively focused on predetermined places on the detector 60 through the lens 50. That is, the operated results between a plurality of inputs given in the form of a number of two-dimensional information on the film 10 and other inputs given to the optical information modulator similarly in the form of two-dimensional information are respectively obtained at different positions on the detector 60 which serves as an output means. In this case, when the light beam 70 is directed on the entire area of the film 10, simultaneous processing of the respective minute two-dimensional information is conducted. When the surface of the film 10 is successively scanned with the light beam 70 emanating from a known flying spot scanner, for example, used as the light source, sequential processing is conducted. In the latter case, the detector 60 may consist of, e.g., one photocell.

The optical information modulator 40 subjects light permeating therethrough to two-dimensional amplitude or phase modulation. Although the above-mentioned perforated plate and film are very simple in construction, they need to be replaced in order to change the pattern. In contrast, the modulators utilizing an electro-optical crystal and magnetic bubbles can change the pattern arbitrarily. For example, in the modulator which employs an electro-optical crystal, a number of electrodes are arranged in the form of a matrix on the crystal, and light permeating through the crystal is subjected to phase modulation by the voltage coincidence method. The pattern can be varied as desired in conformity with the manner of applying voltages. When the case of amplitude control is considered as an example, the optical information modulator can display digital states 1 and 0 by locally turning the light on and off. More generally, however, it may be one which can control the transmitted quantity of light continuously and over the entire area.

Figure 2A:
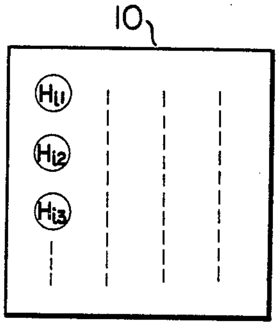
FIGS. 2*a* and 2*b* are schematic diagrams of an information recording medium and an optical information modulator, respectively.
Figure 2B:
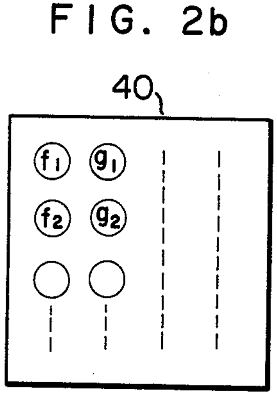

Referring now to FIGS. 2*a* and 2*b*, the principle of optical processing according to the present invention will be described. FIG. 2*a* generally shows the *i*th two-dimensional digital information on the film 10. The digital reconstructed states are made $H_{i1}$, $H_{i2}$, $H_{i3}$ . . . . Those digital states of the optical information modulator 40 which correspond to the positions of the digital reconstructed states are successively arranged as $f_1(X_1, \overline{X}_1)$, $f_2(X_2, \overline{X}_2)$ . . . and $g_1(X_1, \overline{X}_1)$, $g_2(X_2, \overline{X}_2)$ . . . as illustrated in FIG. 2*b*. Herein, *f* and *g* shall be functions of the variables indicated in the parentheses. Here, $X_1$, $X_2$ . . . indicate input signals and $\overline{X}_1$, $\overline{X}_2$, . . indicate complementary signals with respect to $X_1$, $X_2$, . . respectively. It is natural that they may, more generally, be functions of at least three variables. At this time, the logical output $Y_i$ of a part of the *i*th position of the detector which detects the intensity of light can be written as follows:

$$Y_i = H_{i1} f_1 (X_1, \overline{X}_1) + H_{i2} f_2 (X_2, \overline{X}_2) + \ldots + H_{il}\, g_1 (X_1, \overline{X}_1) + H_{im}\, g_2 (X_2, \overline{X}_2) + \ldots \quad (1)$$

Accordingly, when $H_{i1}$, $H_{i2}$ . . . are previously recorded by predetermined codes, outputs $Y_1$, $Y_2$ . . . corresponding to inputs $X_1$, $X_2$ . . . can be obtained. It is also possible to obtain outputs $W_i$ complementary to the outputs $Y_i$ by electric circuitry. The outputs $W_i$ are:

$$W_i = \overline{Y}_i = (\overline{f}_1 + \overline{H}_{i1}) \cdot (\overline{f}_2 + \overline{H}_{i2}) \ldots (\overline{g}_1 + \overline{H}_{il}) \cdot (\overline{g}_2 + \overline{H}_{im}) \ldots \quad (2)$$

Here, $\overline{f}_1$, $\overline{f}_2$, . . . corresponds to complementary signals with respect to $f_1$, $f_2$, . . . respectively, and $\overline{H}_{i1}$, $\overline{H}_{i2}$, . . . indicate complementary signals with respect to $H_{i1}$, $H_{i2}$, . . . respectively.

Various operations become possible by suitably employing the outputs $Y_i$ and $W_i$.

While description has been made herein by taking as an example the case of representing the digital quantity 1 or 0, it is apparent that the present invention is also useful for analog quantities varying continuously, each as pictures. In this case, the output of eq. (1) is the general arithmetic sum.

Figure 3:
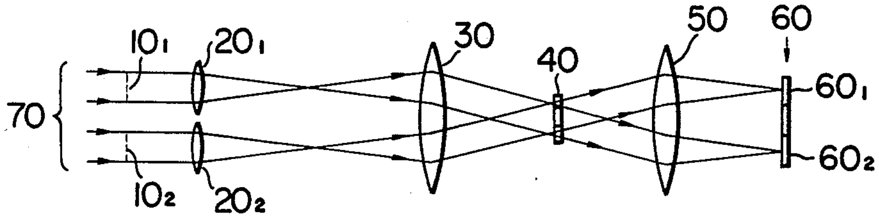
FIGS. 3 and 4 show different examples of construction as based on the principle in FIG. 1.

It is understood from the description in conjunction with FIGS. 1 and 2 that parallel arithmetic processing of a plurality of information can be carried out by the use of coherent or incoherent light. However, the information used in the example have been rather fixed ones. An example of a case where the information changes will now be explained. FIG. 3 generalizes the concept of FIG. 1. More specifically, two-dimensional information $\mathbf{10}_1$ or $\mathbf{10}_2$ whose contents can vary with time is arranged at the front focal positions of microlenses $\mathbf{20}_1$ and $\mathbf{20}_2$. Further, the lens 30, the optical information modulator 40, the lens 50 and the detector 60 are disposed in quite the same mode as in FIG. 1. In accordance with the construction, when the contents of the information $\mathbf{10}_1$ and $\mathbf{10}_2$ have changed, the operations between them and the information of the optical information modulator 40 can be conducted in response to the changes. As the information $\mathbf{10}_1$ and $\mathbf{10}_2$, there can be used, for example, information recorded on a film which is moved with time. Also usable is optical pattern generator means which is provided with the function of allowing or preventing light to pass therethrough by means of an electro-optical crystal, polarizing plate etc. already stated. Further, in a direct manner, a picture may be projected on a diffusing plate which is arranged at the position of the information.

Figure 4:
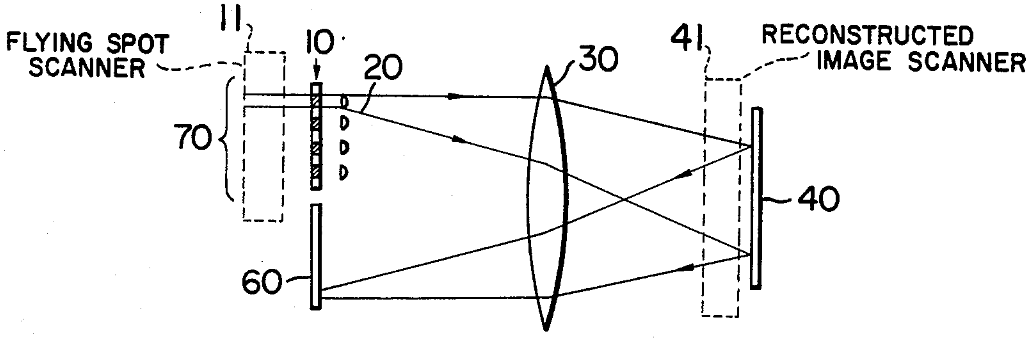

While the construction in FIGS. 1 and 3 are examples in which the permeation type is used as the optical information modulator, it can also be made the reflection type. An example of the construction thereof is shown in FIG. 4. In accordance with the construction, the lens 30 can also serve as a focusing lens for light reflected by the optical information modulator 40. In addition, the overall length of the optical processing apparatus is shortened to approximately a half as compared with the cases of FIG. 1, etc. FIG. 4 also shows, in dotted line form, an illustration of a flying spot scanner for scanning beam 70 across storage plate 10.

If a hologram plate (or film) is utilized as the medium for recording a number of two-dimensional information, the following great advantages are brought forth:

1. There is a redundancy in the recording of information, so that the reliability of reconstructed information can be held high.
2. Large quantities of information can be recorded in a very small area. Besides, the conditions of an optical system as required are comparatively easy.
3. It can be realized by a relatively easy optical system that reconstructed images from a plurality of very small holograms are formed at spacially determined places.

Figure 5:
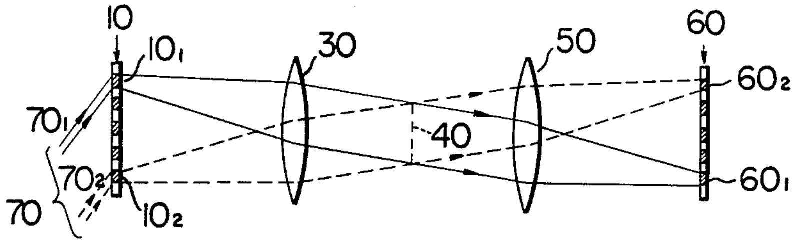
FIG. 5 is a diagram of the principle construction of the apparatus of the present invention as utilizes holograms.

Owing to such advantages, the use of holograms can attain the reduction of cost of the whole system and the enhancement of reliability. In FIG. 5 and further figures, examples of the case of utilizing holograms are shown. Of course, however, some of the illustrated constructions are applicable to other cases than those of holograms.

FIG. 5 is a diagram for explaining the principle of the present invention in the case where holograms are utilized. Parts having the same functions as in FIG. 1 are assigned with the same symbols. Numeral 10 indicates a hologram plate on which a number of two-dimensional information are arranged in the form of minute holograms $\mathbf{10}_1$, $\mathbf{10}_2$ etc. The hologram plate 10 is illuminated with coherent reconstruction light 70. $70_1$ and $\mathbf{70}_2$ represent light rays which form parts of the reconstructing light. Reconstructed images from the holograms fall on the optical information modulator 40. Herein, they can be reconstructed at an identical place by virtue of the property of the hologram, notwithstanding the difference of the positions of, e.g., the minute holograms $\mathbf{10}_1$ and $\mathbf{10}_2$. In FIG. 5, the position of the reconstructed images and that of the optical information modulator are made coincident. For this reason, as in the case of FIG. 1, the reconstructed images of a number of minute holograms are controlled with the single optical information modulator 40. The transmitted light beams of the images are respectively focused on predetermined positions on the detector 60 by means of the lens 50. At this time, the positions $\mathbf{60}_1$ and $\mathbf{60}_2$ of the focused points, for example, correspond to the original holograms $\mathbf{10}_1$ and $\mathbf{10}_2$, respectively. In this case, it is the same as in FIG. 1 that when the reconstructing light 70 is illuminated on the entire area of the hologram plate 10, the simultaneous processing of the respective minute holograms is carried out, and that when the minute holograms on the hologram plate 10 are successively scanned with the reconstructing light 70, the sequential scanning is performed.

Figure 6A:
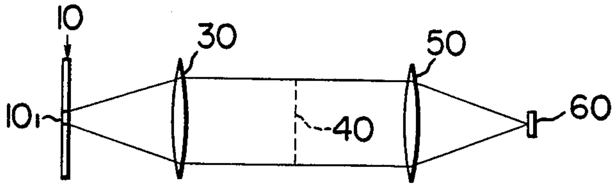
FIGS. 6*a*, 6*b* and 6*c* and FIG. 7 show different examples of construction as based on the principle in FIG. 5.
Figure 6B:
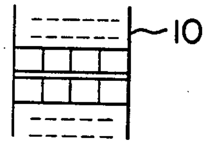
Figure 6C:
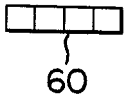

While the construction in FIG. 5 is based on the array of the two-dimensional holograms and detector, it is also possible to make the whole apparatus unidimensional as illustrated in FIG. 6. FIG. 6a shows the whole construction, while FIGS. 6b and 6c show the scheme of holograms and a detector for use, respectively. As shown in FIG. 6b, minute holograms are arrayed on the hologram recording medium (film) 10 in a unidimensional direction. When a desired one of the holograms is to be reconstructed, the hologram recording medium 10 is moved to reconstruct it. If, at this time, the hologram $10_1$, by way of example, is a substantially perfect Fourier transform hologram and the lens 30 is used in reconstruction to form the reconstructed image at the rear focal position thereof, then it is made possible that, even when the hologram recording medium 10 is continuously moved, the reconstructed image is not moved and is spacially fixed. Accordingly, the operation of the information with the optical information modulator 40 is facilitated. In addition, the detector 60 for use in the construction can be made unidimensional as in FIG. 6c. This contributes to the reduction of cost and so forth.

Figure 7:
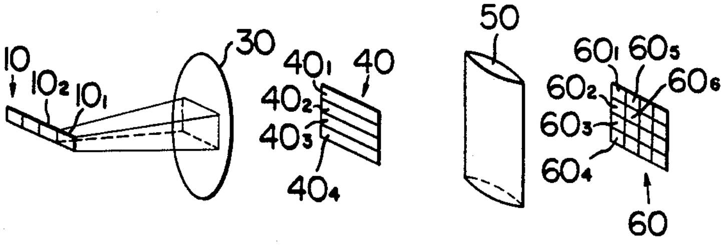

The examples in FIG. 5 and 6 are of the cases where the reconstructed information from one hologram is focused on a specific position of the detector space. In some intended uses, however, it is desirable to form a plurality of focused points. An embodiment for such purpose is shown in FIG. 7. The reconstructed information from, e.g., the hologram $10_1$ is controlled by the optical information modulator 40, whereupon it is focused by the cylindrical lens 50. Thus, control outputs of the optical information modulator for the respective rows are focused on individual points on the detector 60. For example, light beams having passed through the respective rows of control parts $40_1$, $40_2$ . . . are focused on positions $60_1$, $60_2$ . . . on the detector 60. If the reconstruction is made from a different hologram, for example, $10_2$, outputs from the control parts at that time are focused on different points $60_5$, $60_6$ . . . on the detector 60. With the construction of such optical system, the reconstructed information of the hologram can be partially derived as the output by independently controlling it. With electrical processing of the partial outputs, a processing different from the cases having been previously explained is simply made possible. In, e.g., the literature retrieval, a plurality of items can be simultaneously retrieved. They are focused on detector parts becoming output parts, respectively independently. It is accordingly possible to take, for example, the logical sum or the complement of the outputs of the detector parts $60_1$, $60_2$ . . . Besides, the outputs $60_1$, $60_2$ . . . are retrieved outputs from a single hologram, which constitutes a characterizing feature.

When the Fourier transformation type is adopted for the hologram 10 used herein, it is also facilitated to continuously moved the hologram plate in one direction as in the case of FIG. 6.

In the apparatus in FIGS. 5 to 7, the reconstructed image from the hologram is directed onto the optical information modulator through the lens. It is obvious, however, that the illumination is possible without causing the lens to intervene. As is also obvious, it is possible in some cases that a reduced or magnified image is composed by a further lens system, whereupon the image is directed onto the optical information modulator. In addition, in case of reading out a plurality of very small holograms in time series, they can be read out at high speed and in random sequence by the use of a light deflector which takes advantage of the electro-optical effect or the acousto-optical effect. Further, description has been made on the premise that the detector part is arranged for each minute hologram. As is obvious, however, it is also possible in actuality to dispose a detector part for each group of holograms.

Explanation has thus far been made on the assumption that the optical information modulator executes parallel operations for a plurality of two-dimensional picture inputs. There will be herein described a method in which a plurality of two-dimensional pictures are simultaneously scanned, to effect operations corresponding to the respective pictures.

To this end, in the construction of, for example, FIG. 5, the optical information modulator 40 should be such that light is transmitted at only one point at a time, and that the transmitting part moves with time to thereby scan reconstructed images from the respective holograms. An electro-optical crystal of non-memory property is effective for this purpose. For illustrative purposes, a reconstructed image scanner 41 is shown in FIG. 4 in dotted line form. When the optical information modulator 40 is operated in such a way, the contents of the points of the respective two-dimensional pictures can be serially derived in the form of electric signals from the detector devices $60_1$, $60_2$ etc. In this case, the pattern match, for example, is conducted by utilizing the outputs of the detector. Considering the fact that, in order to scan a plurality of pictures, the same number of scanning means as that of the pictures have hitherto been required, it is understood that this method of the invention attains great simplification. Moreover, the scanning is single, which brings forth the advantage that the corresponding points of a plurality of pictures can always correspond precisely in the scanning.

Concretely, when the holograms $10_1$, $10_2$ etc. in FIG. 5 are considered, by way of example, as mere memories, the above method is effective as a method of reading out the memories. Because, among the reconstructed images from the respective holograms, information located at positions corresponding to each other can be sequentially taken out. Of course, if the memory is a digital one of 1 or 0, the scanning need not be continuous, but it may move bit by bit. As another example, there is the reading of color pictures. In, e.g., FIG. 3, the input pictures $10_1$, $10_2$ . . . are assumed to be images having information of certain colors, respectively. In this case, it is required to convert the images into electric signals in exact synchronism. As is understood, the foregoing method is effective at that time. Still another example is the correction of pictures. Not only some of the pictures are read selectively, but also the transmission or reflection factor is varied in the scanning type optical information modulator. Thus, it is possible to read out the pictures while being corrected. For example, in case of taking the correlation between a certain picture already recorded and another signal, the transmission or reflection factor of a scanning part may be changed in response to the signal.

Now, a few examples of application of the optical processing apparatus according to the present invention will be explained.

EXAMPLE 1

First, an application to an information retrieval system is considered. In case of utilizing the construction of, for example, FIG. 5, inputs $X_1$ and $X_2$ of the optical information modulator 40 represent items to-be-retrieved, while the holograms 10 are objects for the retrieval, such as literatures. As regards the literatures, it is assumed that different ones are respectively recorded in correspondence with the positions of the holograms. It is also supposed that the respective holograms are coded so as to allow the retrieval in a desired item therefor. As an example, a case is taken where the coding and retrieval are made so that an output may become $Y_1 = 1$ only when the inputs (such as key words) are $X_1 = X_2 = 1$. Then, $$W_i = X_1\, X_2$$

suffices for the above retrieval. Accordingly, as understood from Eq. (2) already stated, it suffices to record codes for the literatures in conformity with:

$$H_{il} = \overline{X}_1,\ H_{il} = X_1,\ H_{i2} = \overline{X}_2 \text{ and } H_{im} = X_2,$$

to set $f_1 = \overline{X}_1, f_2 = \overline{X}_2,$ $g_1 = X_1$ and $g_2 = X_2,$ and to make the other $f$ and $g$ zero. Herein, $\overline{X}_2$ is in the complementary relation to $X_2$.

As to a different form of retrieval, for example, $$W_i = X_1\, \overline{X}_2$$

it is possible to consider in similar way. Further, other items may be simultaneously present.

In accordance with the principle, the present invention brings forth the advantage that the retrieval can be made at high speed on a number of literatures and on a number of items.

In case of executing the retrieval of this material, the optical information modulator is not restricted to one capable of controlling the transmission factor simultaneously in two dimensions, but a method is also possible in which the retrieval is conducted in successive scanning of every bit. In this case, it is necessary to provide a logical circuit by which, when inconsistency (even by 1 bit) arises between the whole information under retrieval and a retrieval code, an output corresponding to a detector device concerned becomes zero.

EXAMPLE 2

The present invention can also be utilized for the recognition of characters or patterns. In case of discriminating inputs of Chinese characters, the alphabet etc., a hologram plate on which the standard patterns of the respective characters are recorded is used for the holograms 10 in the construction of, e.g., FIG. 5, and a character intended now for judgement is displayed on the optical information modulator 40. In this case, the display of the character may be digitalized to 1 and 0, or may be in the analog form as usual. In addition, the character portion may have the transmission factor changed continuously in this case. Under such a state, as in the previous example 1, the processed outputs between the reconstructed images of the respective holograms $\mathbf{10}_1$, $\mathbf{10}_2$ etc. and the information of the optical information modulator 40 are detected in the detector devices $\mathbf{60}_1$, $\mathbf{60}_2$ etc. to which the respective holograms correspond. By way of example, the correlation between the standard characters recorded as the holograms and the character presently under display is taken in such construction. Which standard character the character now displayed on the optical information modulator 40 is identical with, can accordingly be judged by comparing the correlative outputs with one another.

If, in this case, all the standard characters are arrayed on the hologram plane in the construction of FIG. 5 and they are simultaneously read out, then a number of correlative outputs are obtained in parallel at very high speed at the same time. Therefore, a highly-speedy character recognition becomes possible.

It is natural that, if a plurality of correlative outputs are of the same degree, the precision of discrimination can be raised by, for example, shifting the positions of characters imaged and reconstructed on the optical information modulator. One method for this purpose is to change the angles of incidence of the coherent reconstructing light beams $\mathbf{70}_1$, $\mathbf{70}_2$ etc.

In this manner, the character discrimination at high speed is made possible by the present invention.

EXAMPLE 3

An example of application to a type of code conversion will be described hereunder. By way of example, let's consider a case where inputs $X_1$, $X_2$ . . . in the binary notation are turned to values in the decimal notation. The respective positions on the detector are caused to correspond to decimal numbers. Thus, the output is made 1 only at the positions which correspond to given binary inputs.

For example, a binary number $(X_2\ X_1) = (10)$ provides an output only at the place of the corresponding decimal number, namely, 2. That is:

$$W_2 = \overline{X}_1\, X_2$$

or $$Y_2 = X_1 + \overline{X}_2$$

Accordingly, hologram is recorded so that only the positions $X_1$ and $\overline{X}_2$ may be 1, whereas the other positions may be 0. Thus, only when $(X_2\ X_1) = (10)$ comes to $Y_2$, the output becomes $W_2 = 1$. The same applies to the other detector positions.

In accordance with this method, a variety of code conversions can be executed for a number of bits at high speed by suitably making use of the optical information modulator.

As described above, according to the present invention, in an optical information processing system which has a plurality of picture input parts and a plurality of output parts, the simultaneous or sequential processing of picture inputs can be conducted at high speed and accurately by appropriate operations of a single optical information modulator. A wide range of uses are therefore expected.

We claim:

1. Optical processing apparatus comprising:

a light source;

storage means containing a plurality of pieces of optical information spacially distributed thereover, said light source and said storage means being so arranged as to simultaneously illuminate all of said plurality of pieces of information in said storage means;

optical means, disposed to receive respective light beam portions passing through said storage means from said light source, for producing reconstructed images of said pieces of optical information at a prescribed spacial location;

a single means disposed at said prescribed spacial location, for modulating the amplitude of the light of said reconstructed images of said pieces of optical information;

an optical detector having a plurality of optical detecting elements; and means, disposed to receive the modulated reconstructed images of said pieces of optical information, for simultaneously focusing said modulated reconstructed images onto said optical detecting elements, thereby providing an output representative of the modulated reconstructed images of said pieces of optical information.

2. Optical processing apparatus according to claim 1, wherein said storage means includes a hologram medium containing a plurality of minute holograms representing said pieces of optical information.

3. Optical processing apparatus according to claim 1, wherein said storage means includes a hologram plate containing a plurality of minute holograms representing said pieces of optical information.

4. Optical processing apparatus according to claim 1, wherein said single modulating means is such that only a portion of the reconstructed images is transmitted through a part of said modulating means, said transmissive part being sequentially shiftable over the entirety of said modulating means.

5. Optical processing apparatus according to claim 4, wherein the amount of transmission of light is varied with time.

6. Optical processing apparatus according to claim 1, wherein said single modulating means is such that only a portion of the reconstructed images is reflected at a part of said modulating means, said reflective part being sequentially shiftable over the entirety of said modulating means.

7. Optical processing apparatus according to claim 6, wherein the amount of reflection of light is varied with time.

8. Optical processing apparatus according to claim 1, wherein said focusing means is such that said modulated reconstructed images are separately focused into said optical detector.

9. Optical processing apparatus comprising:

a light source;

storage means containing a plurality of pieces of said optical information spacially distributed thereover, said plurality of pieces of information being simultaneously illuminated by said light source;

means, disposed at a prescribed spacial location where an image of each of said pieces of information is reconstructed by a respective light beam portion from said light source passing through said storage means, for individually spacially modulating the amplitudes of the reconstructed images of said pieces of optical information;

a plurality of optical detectors; and means, disposed to receive the modulated reconstructed images of said pieces of optical information, for focusing said modulated reconstructed images onto said plurality optical detectors, thereby providing an output representative of the modulated reconstructed images of said pieces of optical information.

10. Optical processing apparatus according to claim 9, wherein said storage means includes a hologram plate containing a plurality of minute holograms representing said pieces of optical information.

11. Optical processing apparatus according to claim 9, wherein said modulating means is such that only a portion of the reconstructed images is transmitted through a part of said modulating means, said transmissive part being sequentially shiftable over the entirety of said modulating means.

12. Optical processing apparatus according to claim 11, wherein the amount of transmission of light is varied with time.

13. Optical processing apparatus according to claim 9, wherein said modulating means is such that only a portion of the reconstructed images is reflected at a part of said modulating means, said reflective part being sequentially shiftable over the entirety of said modulating means.

14. Optical processing apparatus according to claim 13, wherein the amount of reflection of light is varied with time.

15. Optical processing apparatus according to claim 9, wherein said focusing means is such that said modulated reconstructed images are separately focused into said plurality of detectors.

16. An optical processing apparatus comprising:

a storage medium containing a plurality of pieces of optical information spacially distributed thereacross;

first means for directing light onto said storage medium and for producing a respective plurality of reconstructed images of the information spacially distributed across said storage medium at a prescribed spacial position relative to said storage medium;

second means, disposed at said prescribed spacial position, for spacially modulating the amplitudes of the respective reconstructed images produced thereat by said first means;

photodetecting means having a plurality of photodetecting elements; and third means, disposed between said second means and said photodetecting means, for simultaneously focusing the reconstructed images modulated by said second means onto said photodetecting means, to produce therefrom an output representative of the modulated reconstructed images of said pieces of optical information.

17. Optical processing apparatus according to claim 16, wherein said storage medium comprises a hologram medium containing a plurality of minute holograms representing said pieces of optical information distributed thereacross.

18. Optical processing apparatus comprising:

a recording medium in which a plurality of pieces of standard information are recorded;

a light source producing light for simultaneously illuminating said plurality of pieces of standard information;

a single means, disposed at a location where reconstructed images of said plurality of pieces of standard information are formed by said simultaneous illumination from said light source, for modulating the spacial distribution of the amplitudes of said reconstructed images with unknown information, thereby obtaining a coincidence output between said reconstructed images and said unknown information;

means for focusing said modulated reconstructed images;

a plurality of means, disposed at a location where said modulated reconstructed images are to be focused, for detecting said focused, modulated, reconstructed images; and means for comparing the amplitudes of the outputs from said plurality of detecting means with each other, thereby discriminating with which of said pieces of standard information of said unknown information corresponds.

19. Optical processing apparatus according to claim 18, wherein the apparatus further comprises optical means for focusing said reconstructed images on said single modulating means, said optical means located between said record medium and said single modulating means.

* * * * *